(12) United States Patent
Watai

(10) Patent No.: US 6,199,994 B1
(45) Date of Patent: Mar. 13, 2001

(54) SURFACE LIGHT SOURCE DEVICE OF SIDE LIGHT TYPE

(75) Inventor: Kayoko Watai, Hasuda (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 08/962,258

(22) Filed: Oct. 31, 1997

(30) Foreign Application Priority Data

Nov. 6, 1996 (JP) .................................................... 8-310016

(51) Int. Cl.[7] .......................................................... F21V 8/00
(52) U.S. Cl. .................................................................. 362/31
(58) Field of Search ........................................ 362/26, 31

(56) References Cited

U.S. PATENT DOCUMENTS

| | | | |
|---|---|---|---|
| 5,363,294 | * | 11/1994 | Yamamoto et al. ................ 362/26 X |
| 5,550,676 | * | 8/1996 | Ohe et al. ............................ 362/26 X |
| 5,921,651 | * | 7/1999 | Ishikawa ................................. 362/31 |
| 5,926,033 | * | 7/1999 | Saigo et al. ......................... 362/26 X |
| 5,956,107 | * | 9/1999 | Hashimoto et al. ................ 362/31 X |

* cited by examiner

*Primary Examiner*—Laura K. Tso
(74) *Attorney, Agent, or Firm*—Staas & Halsey LLP

(57) ABSTRACT

An effective radiation region of a rod-type light source 8 having circumferences of electrodes 8A and 8B has a length AR. A light diffusible surface 10D (or 10D') is formed on the rear surface (or emitting surface) of a light guide plate 10 to which a light is supplied from the rod-type light source 8. The light diffusible surface 10D (10D') has an emission quantity suppressing region AR1, emission quantity promoting region AR2 and light quantity control region AR3. The emission quantity suppressing region AR1 is formed in the vicinity of an incidence surface of the light guide plate 10 so as to have a dimension nearly equal to AR. The emission quantity promoting region AR2 is formed in the vicinities of both the ends of the emission quantity suppressing region AR1. The emission quantity promoting region AR2 is formed so as to have light scattering power which is increased locally near the incidence surface. The light quantity control region AR3 is formed so that light scattering power is increased gradually according to a distance from the incidence surface. The emission quantity suppressing region AR1 prevents excessive light emission, and the emission quantity promoting region AR2 supplements insufficient light emission in the circumferences of the electrodes 8A and 8B.

12 Claims, 6 Drawing Sheets

5:光拡散シート

1:サイドライト型面光源装置

SURFACE LIGHT SOURCE DEVICE OF SIDE LIGHT TYPE

BACKGROUND

1. Field of the Invention

The present invention relates to a surface light source device of side light type, more specifically, relates to a surface light source device of side light type in which uniformity of luminance is improved. The present invention is applied to back lighting of a liquid crystal display device, for example.

2. Related Art

It is know that a surface light source device of side light type provides a back lighting arrangement of thin type for lighting a liquid crystal display panel. In general, the surface light source device of side light type has a light guide plate which is a plate member composed of a light guide material, and a primary light source including a rod-type light source for supplying an illumination light to the light guide plate sideways.

The illumination light emitted from the primary light source is guided into the light guide plate through an end surface of the light guide plate (incidence surface). The guided illumination light is refracted to be emitted from one major surface of the light guide plate to a liquid crystal display panel. Since the primary light source is arranged beside the light guide plate, the whole device can be thinned easily.

As, the light guide plate employed in the surface light source device of side light type, a plate having substantially uniform thickness, and a plate whose thickness tends to become smaller as the distance from the primary light source increases, are known. In general, the latter plate emits an illumination light more efficiently than the former plate.

FIG. 4 is an assembly perspective view showing a general structure of the surface light source device of side light type using the latter light guide plate. FIG. 5 is a cross section taken along line A—A in FIG. 4. Referring to both the drawings, a surface light source device of side light type 1 has a light guide plate 2, and a primary light source 3 is arranged besides the light guide plate 2. The surface light source device 1 further has a reflection sheet 4, a diffusible sheet 5, and prism sheets 6 and 7 which serve as light control members, and they as well as the light guide plate 2 are laminatedly arranged as shown in FIG. 5.

The primary light source 3 has a cold cathode tube (fluorescent lamp) 8 and a reflector 9 which surrounds the cold cathode tube 8. The reflector 9 has an opening, and supplies an illumination light to the end surface 2A of the light guide plate 2 through the opening. The reflector 9 is composed of a regular reflection or irregular reflection sheet material, etc. The light guide plate 2 with wedge-shaped cross section is formed by the injection molding method of acrylic (PMMA) resin, for example. The light guide plate 2 receives the illumination light of the primary light source 3 from the incidence surface 2A which is one end surface.

The light guided into the light guide plate 2 is simultaneously reflected and propagated repeatedly between a major surface along the reflection sheet 4 (hereinafter, referred to as "slanted surface") 2B and another major surface along the diffusible sheet 5 (hereinafter, referred to as "emitting surface") 2C.

In every reflecting time, a component having an incidence angle not more than a critical angle is emitted from the slanted surface 2B and emitting surface 2C. Therefore, the main propagating direction of the illumination light emitted from the emitting surface 2C is slanted to a direction of the point of the wedge shape. This is called directional emitting characteristic.

Further, a light diffusible surface 2D is formed on the slanted surface 2B. A diffusible characteristic which is increased from the incidence surface 2A to the point of the wedge shape is given to the light diffusible surface 2D. The diffusible characteristic is given by application of diffusible ink which includes pigment such as magnesium carbonate and titanic oxide. A degree of the diffusible characteristic can be adjusted according to an amount of application of the diffusible ink.

Instead of by the application of the diffusible ink, by forming the slanted surface 2B on a satin finished surface (rough surface), the diffusible characteristic may be given. Also in this case, the diffusible characteristic is given so as to be increased gradually towards a direction from the incidence surface 2A to the point of the wedge shape. For this reason, a region of the rectangular, for example, the satin finished surface is formed at constant or random pitch so as to be distributed with high density towards the direction from the incidence surface 2A to the point of the wedge shape.

This light guide plate 2 corrects lowering of emission quantity in the vicinity of the point of the wedge shape, and makes a quantity distribution of the emitted light uniform. Here, a point to which special attention should be paid is that the diffusible characteristic is not enough strong to lose emission directivity of the light guide plate. Namely, even when the diffusible characteristic is given to the slanted surface 2B, the main propagating direction of the illumination light emitted from the emitting surface 2C is slanted to the direction of the point of the wedge shape.

The reflection sheet 4 is formed by a sheet-type regular reflection member composed of metallic foil, etc. or a sheet-type irregular reflection member composed of white PET film, etc. The illumination light leaking from the slanted surface 2B is reflected by the reflection sheet 4 to enter the light guide plate 2 again, and as a result, the use efficiency of the illumination light is improved.

The prism sheets 6 and 7 are arranged in order to correct the emission directivity of the light guide plate 2. The diffusible sheet 5 is arranged so as to prevent the light diffusible surface 2D of the slanted surface 2B from visually recognizing from an upper part of the emitting surface 2c, and to make brightness and shadow, etc. of each portion of the light guide plate 2 which is irradiated by the illumination light unnoticeable.

The diffusible sheet 5 diffuses the illumination light emitted from the light guide plate 2. The prism sheets 6 and 7 are formed by transparent sheet materials such as polycarbonates. The prism surface is formed on a surface (outer surface) which is opposite with the light guide plate 2. This prism surface is composed of a plurality of protrusions having rectangular cross section which are extended substantially parallel with one direction. In this example, the prism sheet 6 on the inner side is aligned that its protrusions are extended parallel with the incidence surface 2A, and the prism sheet 7 is aligned so that its protrusions are extended to a direction which intersects perpendicularly to the incidence surface 2A.

The prism sheets 6 and 7 correct the main emitting direction of the emitted light to a frontal direction of the emitting surface 2C on the slanted surface of each protrusion. A so-called dual-side prism sheet in which the prism surfaces are formed on both the surfaces may be used.

In general, the surface light source device of side light type adopting the wedge-shaped light guide plate and prism sheets can emit an emitting light to the frontal direction more efficiently than the surface light source device of side light type adopting the light guide plate having substantially uniform thickness.

Such a surface light source device of side light type causes following one problem in connection with an electrode of the rod-type light source (fluorescent lamp 8). In general, the fluorescent lamp 8 as the rod-type light source has electrodes 8A and 8B at its both ends. Regions of the inner wall of the tube to which a fluorescent material is not applied exist in the vicinities of the electrodes 8A and 8B. For this reason, regions which do not emit illumination lights L efficiently are formed in the vicinities of both the ends of the fluorescent lamp 8. A portion other than these regions (center or its circumference) provides an efficient light emitting region which emits an illumination light efficiently.

When a length H of the incidence surface 2A of the light guide plate 2 is larger than a length of the fluorescent lamp 8, as represented by B in FIG. 4, an emission quantity is lowered at the side end of the incidence surface, and thus nonuniformity of luminance occurs.

According to a conventional solving method, as shown in FIG. 7, the incidence surface 2A having a longer length H than the fluorescent lamp 8 requires a light scattering surface 2D in the vicinities of the electrodes 8A and 8B where light scattering power is strong locally. For this reason, an ink adhesion area which is large per unit area is provided to the vicinities of the electrodes 8A and 8B. As a result, in the light guide plate 2, the emission from the emitting surface is promoted in the vicinities of the end surfaces, and lowering of the emitting light intensity is supplemented.

FIGS. 6 and 7 illustrate distribution of the light diffusible surface (ink adhesion portion) 2D on the slanted surface of the conventional light guide plate 2. The line C—C represents a cross line in the vicinity of the incidence surface 2A. Attention should be paid to that in both the light guide plates 2, the length of the incidence surface 2A is slightly smaller than the length of the fluorescent lamp 8.

In the case of FIG. 6, the ink adhesion area per unit area is increased simply according to a distance from the incidence surface 2A. A curved line LA in FIG. 8 represents the luminance of the emitting surface along the line C—C. As is clear from this, in this case, the emission quantity on the side of the incidence surface 2A represented by line C—C is lowered greatly in the vicinities of both the ends of the incidence surface.

On the contrary, as shown in FIG. 7, when the light scattering power is increased locally in the vicinities of the electrodes 8A and 8B, as shown by a curved line LB in FIG. 8, the luminance in the circumference of the end portions is increased.

However, even if the light guide plate 2 show n in FIG. 7 is used, the problem is not sufficiently solved, and the emission quantity (luminance) is more insufficient in the vicinities of the electrodes 8A and 8B than the central portion.

OBJECT AND SUMMARY OF THE INVENTION

It is an object of the present invention to provide a surface light source device of side light type in which the above problems are solved and uniformity of the luminance is improved. The present invention is applied to a surface light source device of side light type which has a light guide plate including an incidence surface, emitting surface and surface opposite with the emitting surface, and has a rod-type light source arranged along the end surface forming the incidence surface.

According to the present invention, a light scattering surface for scattering an illumination light to at least one of the emitting surface and surface opposite with the emitting surface of the light guide plate. The light scattering surface has an emission quantity suppressing region, an emission quantity promoting region including a portion where a light scattering power is increased locally, and a light quantity control region which is adjacent to the above regions.

The emission quantity suppressing region is formed in the vicinity of the incidence surface so as to have a dimension according to an effective radiation region of the rod-type light source. The emission quantity promoting region is formed in the vicinities of both ends of the emission quantity suppressing region. The light quantity control region is formed so that the light scattering power increases gradually as the distance from the incidence surface increases.

It is preferable that the emission quantity promoting region is formed so that the light scattering power is reduced gradually with going away from the incidence surface.

The emission quantity suppressing region may be formed on the emitting surface or the surface opposite with the emitting surface as a region having a reflecting characteristic close to a plane mirror. It is preferable that a cross section form of the light guide plate is such that its thickness becomes thinner gradually with going away from the incidence surface.

The emission quantity suppressing region AR1 prevents excessive light emission, and the emission quantity promoting region AR2 supplements insufficient light emission in the circumferences of the electrodes 8A and 8B. The gradient of the scattering power which is given to the light quantity control region and emission quantity promoting region improves uniformity of the luminance in the longitudinal sectional direction of the light guide plate.

The above and further features of the invention will more fully be apparent from the following detailed description with accompanying drawings.

PREFERRED EMBODIMENTS

Figure 1:
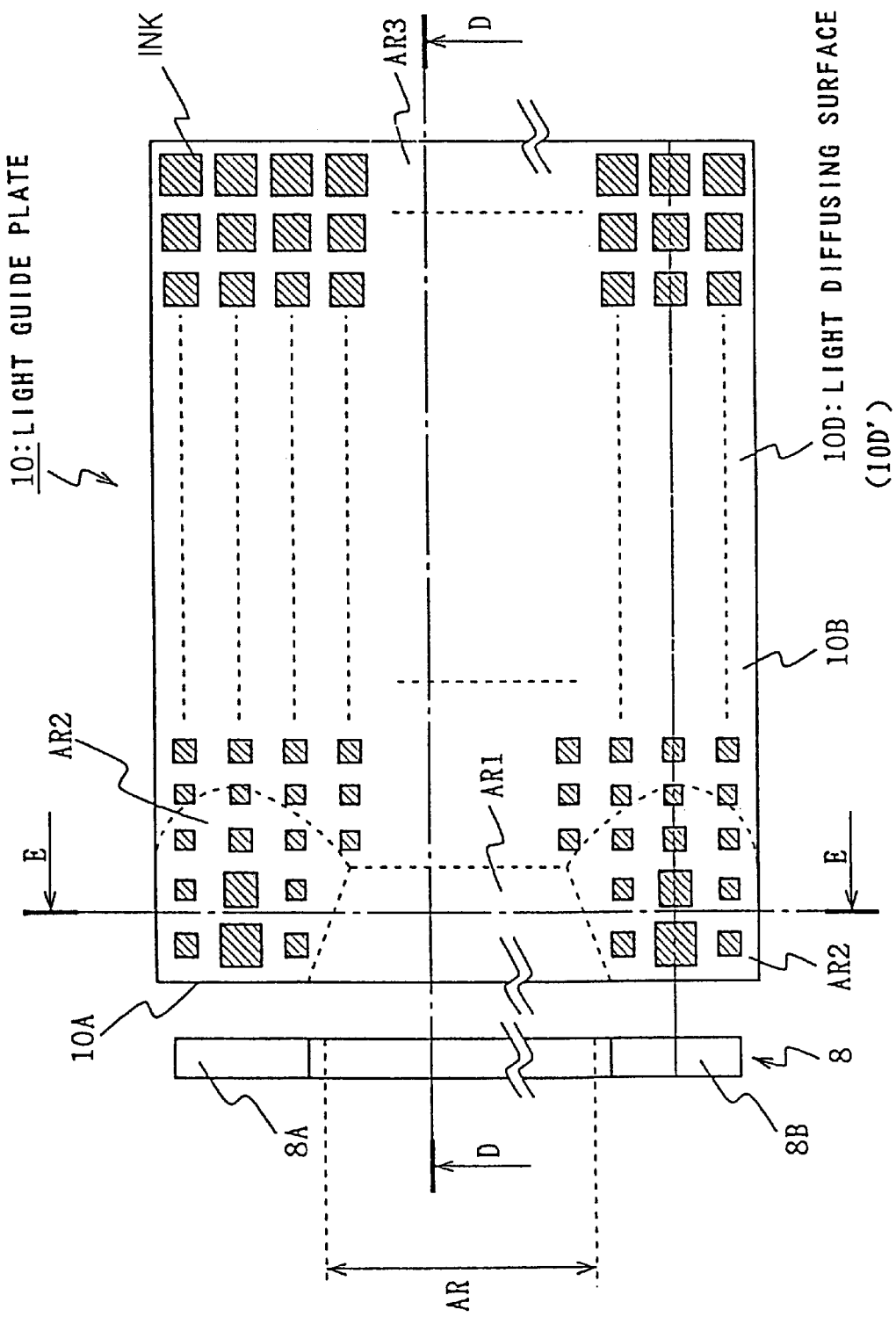
FIG. 1 a plan view showing a slanted surface or emitting surface of a light guide plate employed in a surface light source device of side light type according to one embodiment of the present invention.
Figure 4:
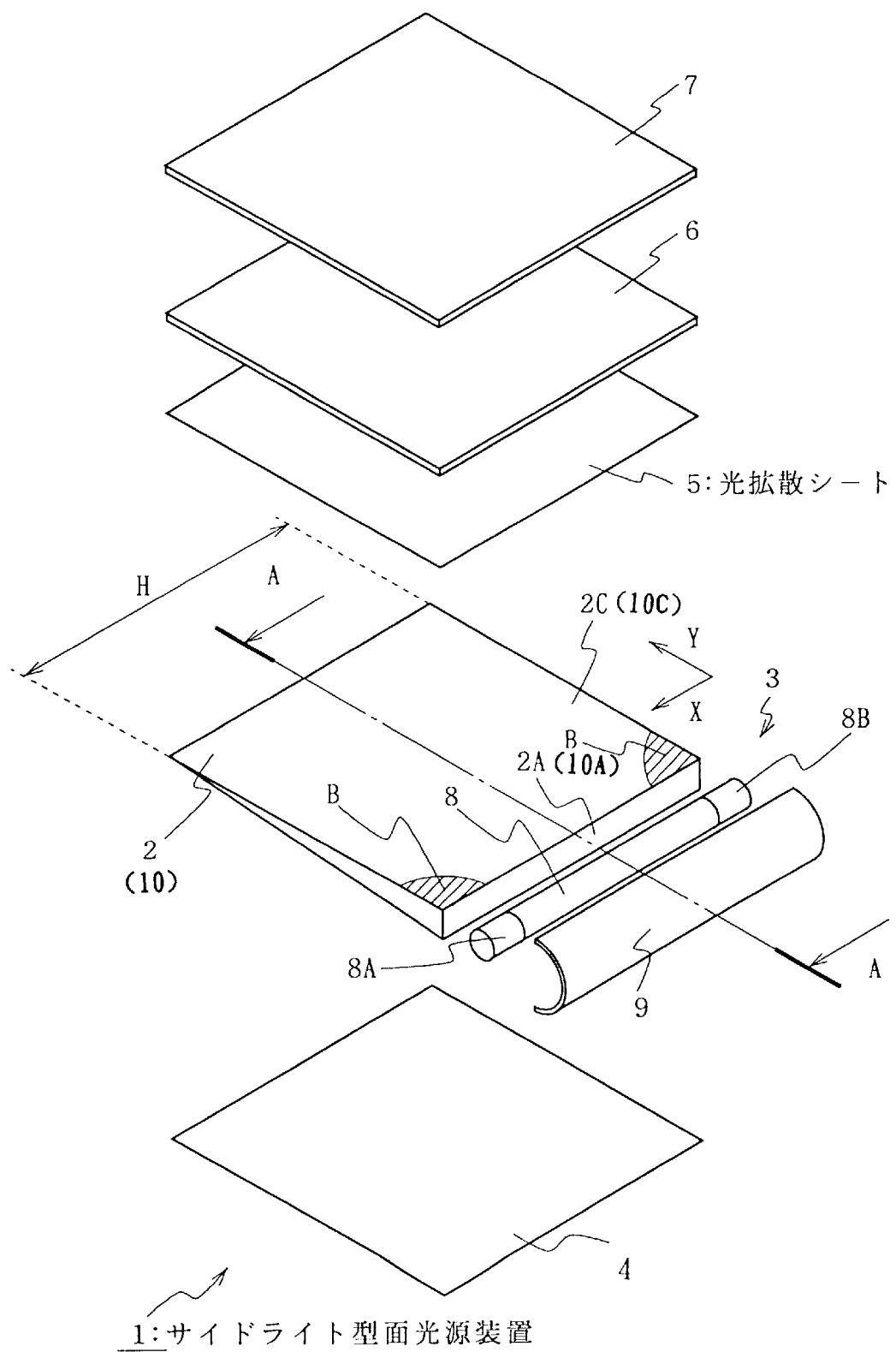
FIG. 4 is a assembly perspective view showing a general arrangement of the surface light source device of side light type.
Figure 5:
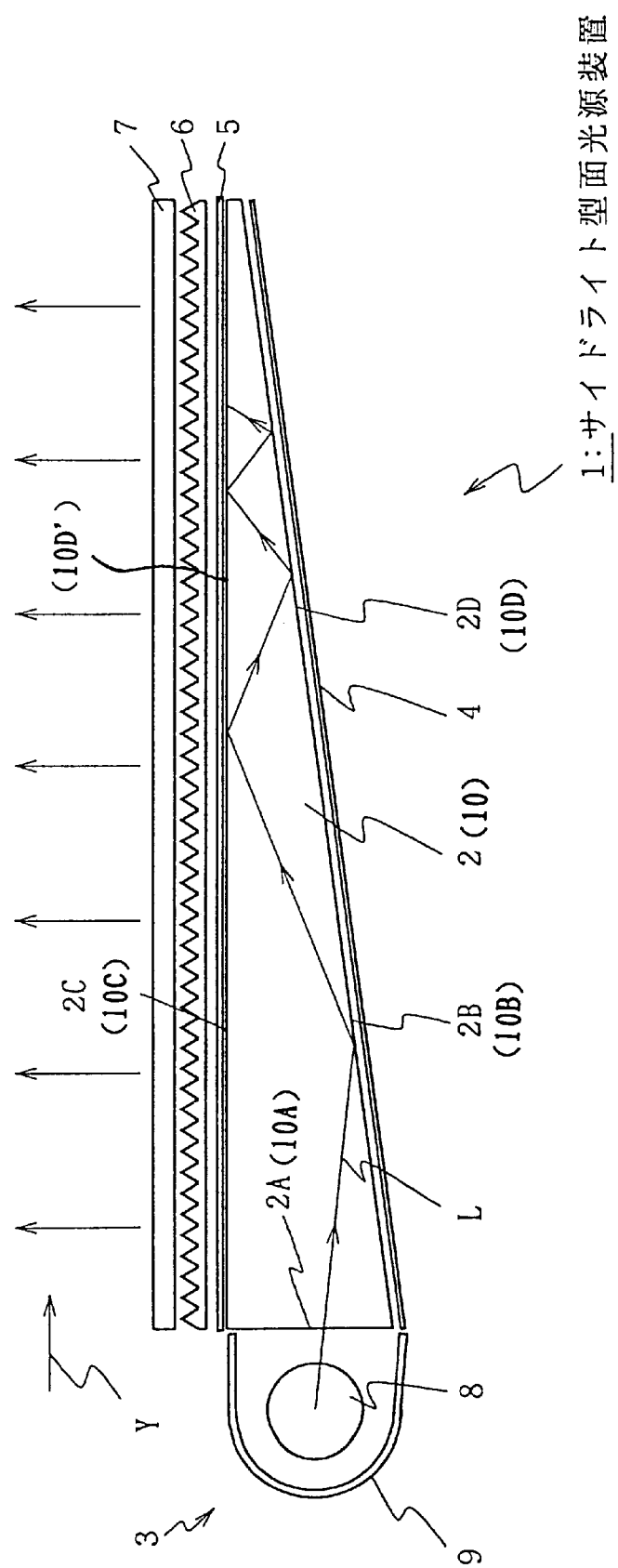
FIG. 5 is a cross sectional view along line A—A in FIG. 4.
Figure 6:
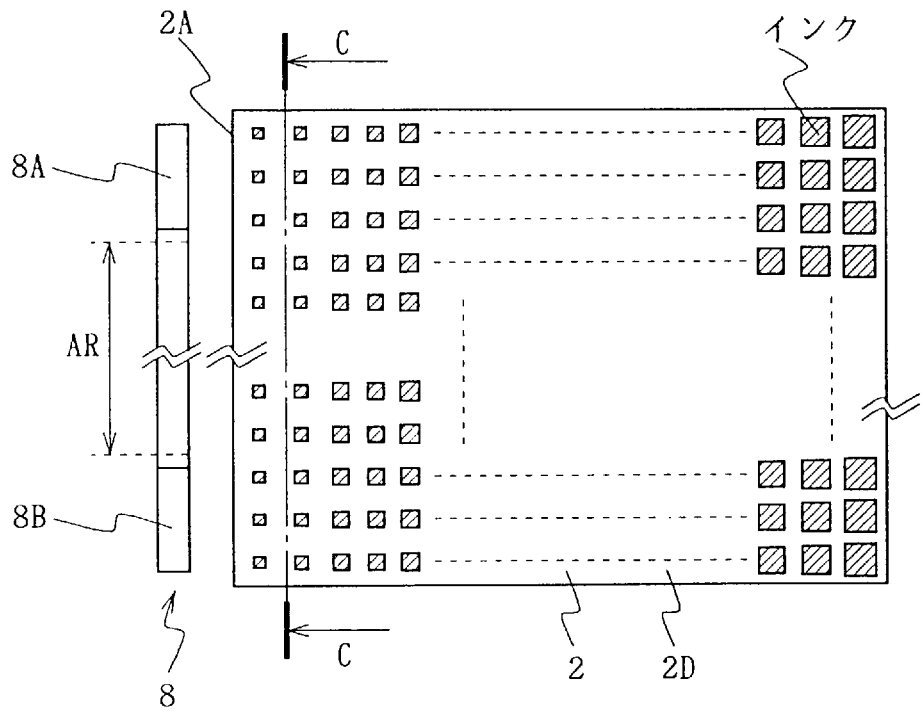
FIG. 6 is a plan view showing a slanted surface of the light guide plate in which a light diffusible surface is formed so that light scattering power is increased simply according to a distance from the incidence surface.

The following describes embodiments of the present invention on reference to FIGS. 1, 4 and 5. In order to show a feature of the present invention, FIG. 1 shows a case where a light scattering surface is formed on a light guide plate employed in the present embodiment. The light scattering surface is formed on a slanted surface ("back surface"), emitting surface or on both the surfaces. Here, for convenience of the explanation, the detailed description is given as to the case where the light scattering surface is formed only on the slanted surface.

The light scattering surface ("light scattering regions"), which is formed on at least one of the emitting surface and slanted surface of a light guide plate 10, is represented by 10D in parentheses in FIG. 5. Similarly, the incidence surface, emitting surface and slanted surface are represented respectively by 10A, 10C and 10B parentheses in FIGS. 4 and 5. Here, 10D' parenthesis in FIGS. 1 and 5 shows a case that the light diffusible surface is formed on the emitting surface 10C.

A reflection sheet 4 (see FIG. 4; not shown in FIG. 1) arranged along the slanted surface adopts a white PET sheet composed of an irregular reflection member. The reflection sheet 4 as well as the light scattering surface 10D on the slanted surface of the light guide plate 10 scatter and reflect an illumination light emitted from the slanted surface of the light guide plate 10, and return the illumination light into the light guide plate 10.

The light scattering surface 10D, similarly to the light scattering surface 2D, is formed by ink printing, but its distribution has a characteristic which is different from the light scattering surface 2D. As illustrated by a rectangular elements in FIG. 1, the light scattering surface 10D is composed of a lot of light diffusible surface elements. In order to form an emission quantity suppressing region AR1, weak scattering power is given to some of the light diffusible surface elements.

As shown by a broken line, the emission quantity suppressing region AR1 has an expanse according to an effective radiation region AR of a fluorescent lamp 8, and it is formed to belt shape in the vicinity of the incidence surface 10A. The light diffusible surface elements in this region are composed of a surface close to a plane mirror so as to have weak scattering power. Therefore, in the emission quantity suppressing region AR1, a distribution of an incidence angle of the illumination light entering the slanted surface becomes slightly irregular by reflection.

Meanwhile, an emission quantity promoting region AR2 is formed on the transversely outer side of the emission quantity suppressing region AR1. The light diffusible surface elements in the emission quantity promoting region AR2 have scattering power which is increased locally close to the incidence surface 10A. In the emission quantity promoting region AR2, the angular distribution of illumination light impinging on the slanted surface is widened according to the scattering power, and as a result, the emission from the emitting surface of the light guide plate 2 is promoted.

Since the emission quantity promoting region AR2 is formed corresponding to electrodes 8A and 8B of a rod-type light source (fluorescent lamp 8), insufficient luminance is compensated according to the electrodes 8A and 8B.

When the scattering power is lowered according to a distance from the incidence surface 10A, a tendency of the insufficient luminance according to the electrodes 8A and 8B is decreased. Therefore, it is advantageous to keep the luminance uniform that the light scattering power is lowered gradually with going away from the incidence surface 10.

From this point of view, the light scattering surface 10D is formed so that a light quantity control region AR3 is adjacent to the emission quantity suppressing region AR1 and emission quantity promoting region AR2.

In the light quantity control region AR3, the light scattering power is increased gradually with going away from the incidence surface 10A. As a result, the emission quantity from the emitting surface is kept uniform regardless of the distance from the incidence surface 10A.

Action of the light in the surface light source device adopting the aforementioned light guide plate 10 is as follows. After an illumination light L emitted from the fluorescent lamp 8 (see FIG. 5) is reflected directly or by a reflector 9, it is guided from the incidence surface 10A into the light guide plate 10. While, the guided illumination light is reflected repeatedly between the slanted surface 10B and emitting surface 10C, it is propagated through the light guide plate 10.

At this time, an incidence angle with respect to the slanted surface 10B is smaller in every time of the reflection. A component which is not more than a critical angle with respect to the emitting surface 10C is emitted from the emitting surface 10. Through this process, the illumination light is emitted from the whole emitting surface 10C. If the reflection on the slanted surface 10B is only regular reflection, the illumination light will be emitted from the emitting surface 10C so that the light quantity distribution copes, with the incidence angle distribution when the light is guided from the incidence surface 10A. As a result, in the central portion of the light guide plate 10 (see line D—D), the emission quantity is decreased gradually towards a direction from the incidence surface 10D to a point of a wedge shape.

However, the light guide plate 10 in the present embodiment doesn't have such a simple regular and irregular reflecting function on the slanted surface 10B. According to the present embodiment, the belt-shaped emission quantity suppressing region AR1 is formed in the vicinity of the incidence surface 10A corresponding to the effective radiation region AR of the fluorescent lamp 8, and the emission quantity promoting regions AR2 are formed at both sides of the emission quantity suppressing region AR1. Further, the light quantity control region AR3 is formed so as to be adjacent to both the regions AR1 and AR2.

As mentioned above, in the emission quantity suppressing region AR1 having a function like a plane mirror, the illumination light is scattered and reflected only by the reflection sheet 4 arranged along the slanted surface 10B. Therefore, in the emission quantity suppressing region AR1, the emission quantity is suppressed more than the conventional case of adopting the slanted surface on which the light scattering surface is formed uniformly.

In addition, in the light quantity control region AR3, since the light scattering power is increased gradually with going away from the incidence surface 10A, the illumination light is influenced by the scattering action which is increased gradually towards the point of the wedge shape in the vicinity of the slanted surface. As a result, insufficient emission quantity near the point of the wedge shape is compensated, and uniform emission quantity distribution can be obtained in the vicinity of the center portion of the light guide plate 10 (see line D—D).

In the vicinity of both the ends of the light guide plate 10 (portion far from line D—D), insufficient light quantity caused due to the electrodes 8A and 8B is compensated by the emission quantity promoting region AR2.

In the inside of the light guide plate 10 in the vicinity of the incidence surface corresponding to the electrodes 8A and 8B, a comparatively lot of illumination light components, which entered from the effective radiation region AR slantedly at a large angle, exist. If the components are not efficiently converted into an illumination light which is allowed to emit from the emitting surface 10C, an emission quantity will be insufficient in the vicinity of both the ends (portion far from line D—D).

However, according to the present embodiment, the light scattering power which is increased locally is given to the emission quantity promoting region AR2, so a lot of illumination lights which are allowed to emit from the emitting surface 10C are generated, and as a result, insufficient emission quantity is prevented. A point to which special attention should be paid is that in the emission quantity promoting region AR2, the scattering power on the light diffusible surface 10D (light diffusible element) is decreased according to an increase in the distance from the incidence surface 10A. This is because influence of the electrodes 8A and 8B is decreased according to distance from the incidence surface 10A.

As a result of inducing the emission at both the ends in the vicinity of the incidence surface 10A, the illumination light, which is propagated through the light guide plate 10 from the end portion towards the point of the wedge shape, is decreased. However, this decrease is made up by an illumination light which is scattered on the central portion of the light guide plate 10. Therefore, even in the portion far from the line D—D, similarly to the portion close to the line D—D, uniform emission quantity can be obtained.

Figure 2:
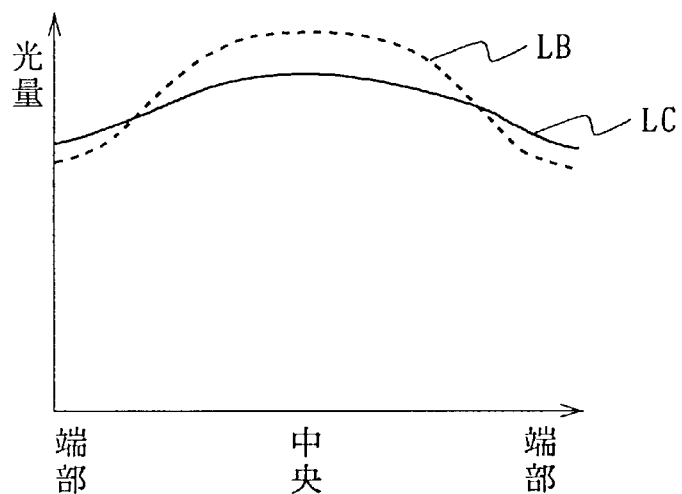
FIG. 2 is a graph of a characteristic curve showing distribution of emission quantity obtained in the surface light source device shown in FIG. 1.
Figure 7:
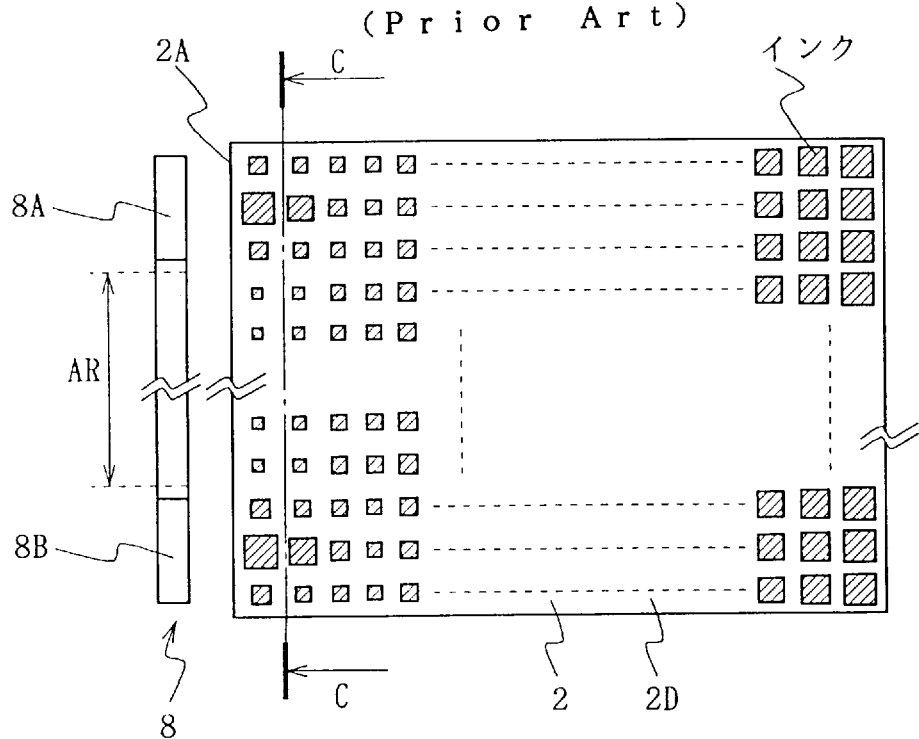
FIG. 7 is a plan view showing the slanted surface of the light guide plate in which the light diffusible surface is formed so that the light scattering power is increased at the end portion.
Figure 8:
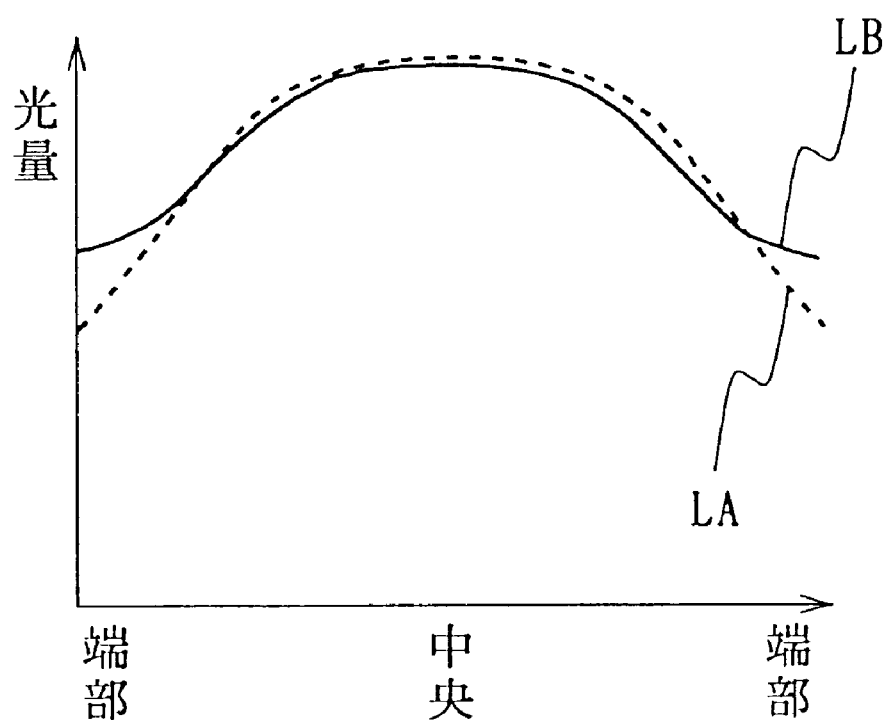
FIG. 8 is a graph of a characteristic curve showing a difference in actions in FIGS. 6 and 7.

FIG. 2 is a graph showing emission quantity distribution (luminance distribution) in the vicinity of the incidence surface 10A (or 2A) in the same form as FIG. 8. A curved line LB, similarly to FIG. 8, shows a measured result (luminance along line C—C) when the light guide plate 2 shown in FIG. 7 is employed. On the contrary, a curved line LC shows a measured result (luminance along line E—E) when the light guide plate 10 shown in FIG. 1 is employed.

The curved line LC is flatter than the curved line LB. Namely, in the vicinity of the incidence surface, a luminance level in the central portion of the light guide plate 10 is suppressed, whereas a luminance level at the end portion is raised.

Figure 3:
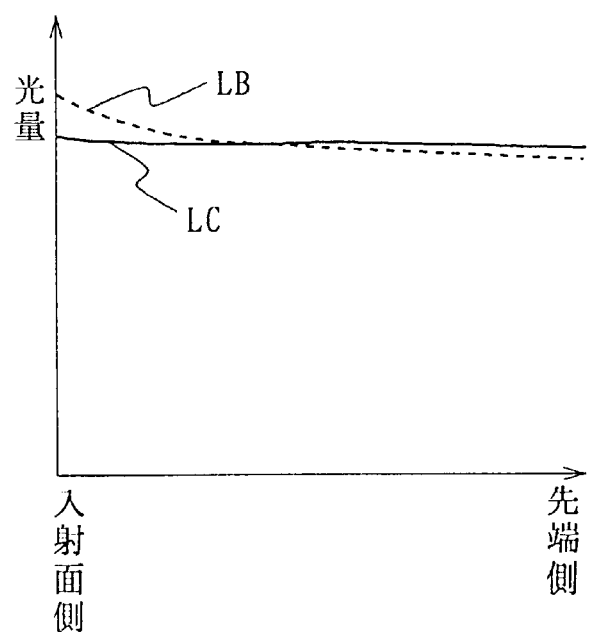
FIG. 3 is a graph of a characteristic curve showing distribution of emission quantity in a direction which intersects perpendicularly to FIG. 2.

FIG. 3 shows a result of observing the luminance level in the central portion of the light guide plate 10 (or 2) in a direction which intersects perpendicularly to the incidence surface 10A (or 2A). The curved line LB shows a result when the light guide plate 2 shown in FIG. 7 is employed, and the curved line LC shows a result when the light guide plate 10 shown in FIG. 1 is employed.

According to comparison of the curved line LC with the curved line LB in FIG. 3, in the present embodiment, it is found that the luminance level is suppressed in the vicinity of the incidence surface, and uniformity of the luminance level of the emitted light in this direction is also improved.

The above describes mainly the case where the light scattering surface is formed on the surface (slanted surface 10B) which is opposite with the emitting surface 10C of the light guide plate 10, but the light scattering surface 10D or 10D' may be formed on the emitting surface 10C or both major surfaces 10B and 10C. The action in this case is basically little different from the one mentioned above.

Namely, in the case where the light diffusible surface 10D', which is provided with the emission quantity suppressing region AR1, emission quantity promoting region AR2 and light quantity control region AR3 having the above characteristics, is formed on the emitting surface 10C so as to have the distribution shown in FIG. 1, the emission is promoted according to given light scattering power. If the characteristic which is close to that of the plane mirror is given to the emission quantity suppressing region AR1, the light emission thereon is suppressed. In the emission quantity promoting region AR2 to which strong scattering power is given locally, the light emission is promoted greatly. Moreover, in the emission quantity promoting region AR3 in which gradient is given to scattering power, gradient is given to a degree of the light emission.

Further, the present invention may be modified as follows.

(a) In the above embodiment, the emission quantity suppressing region AR1 is formed as a surface having a reflecting characteristic which is close to a plane mirror. However, the present invention is not limited to this. For example, a region, in which an ink-applied area per unit area (occupation density of the light diffusible element) is reduced remarkably, may provide the emission quantity suppressing region AR1.

(b) In the aforementioned embodiment, the light scattering surface is formed by printing. However, the present invention is not limited to this. For example, a matted finished (rough surface) formed partially on the slanted surface 10B may provide the light scattering surface.

(c) In the above embodiment, as the reflection sheet, an irregular reflection member composed of white PET is employed. However, the present invention is not limited to this. For example, a regular reflection member such as a film on which silver is vapor-deposited may be employed as the reflection sheet.

(d) In the above embodiment, a so-called single-side prism sheet is arranged along the emitting surface C of the light guide plate 10. However, the present invention is not limited to this. For example, instead of the single-side prism sheet, a so-called dual-side prism sheet may be employed.

(e) In the above embodiment, an illumination light is supplied from one end surface (incidence surface) of the light guide plate. However, the present invention is not limited to this. The light may be supplied from a plurality of end surfaces (incidence surfaces).

(f) In the above embodiment, a cross section form of the light guide plate is a wedge shape. However, the present invention is not limited to this. Instead of the wedge-shaped light guide plate, a simple flat plate type light guide plate where a light diffusible film or light diffusible surface is formed on one surface or both surfaces may be employed.

(g) The above embodiment refers to application to a back lighting of a liquid crystal display device. However, the present invention is not limited to this. The present invention may be widely applied to various kinds of the surface light source devices of side light type such as an lighting equipment and display device.

As detailed above, according to the present invention, when distribution is given to the light scattering power of the light diffusible surface formed on the light guide plate, in the surface light source device of side light type using such a light guide plate, nonuniformity of luminance due to insufficient light quantity of the electrodes at both the ends of a rod-type light source is reduced.

What is claimed is:

1. A surface light source device of side light type comprising:
   a light guide plate having an incidence surface, an emitting surface and a back surface opposite the emitting surface; and
   a rod-type light source arranged along said incidence surface for supplying light to said light guide plate, primarily at an effective radiation region, wherein
      said light guide plate has light scattering regions for scattering the light, on at least one of said emitting surface and said back surface,
      said light scattering regions comprise an emission quantity suppressing region, an emission quantity promoting region including a portion where light scattering power is increased in the vicinity of the incidence surface, and a light quantity control region adjacent to said emission quantity suppressing region and said emission quantity promoting region,
      said emission quantity suppressing region has first and second ends and is formed in the vicinity of the effective radiation region of said rod-type light source,
      said emission quantity promoting region is formed in the vicinities of the first and second ends of said emission quantity suppressing region so that the light scattering power gradually reduces with increasing distance from said incidence surface, and
      said light quantity control region is formed so that the light scattering power gradually increases with increasing distance from said incidence surface.

2. The surface light source device of side light type according to claim 1, wherein said emission quantity suppressing region is formed on said back surface as a region having a reflection characteristic like that of a mirror.

3. The surface light source device of side light type according to claim 1, wherein said emission quantity suppressing region is formed on said emitting surface as a region having a reflection characteristic like that of a mirror.

4. The surface light source device of side light type according to claim 1, wherein said light guide plate is formed so that its thickness gradually decreases with increasing distance from said incidence surface.

5. A The surface light source device of side light type according to claim 1, wherein the light scattering regions are formed by ink printing on the light guide plate.

6. A surface light source device of side light type comprising:
   a light guide plate having an incidence surface, an emitting surface and a back surface opposite the emitting surface; and
   a light source arranged along said incidence surface for supplying light to said light guide plate, primarily at an effective radiation region, wherein
      said light guide plate has light scattering regions for scattering the light, on at least one of said emitting surface and said back surface,
      said light scattering regions comprise an emission quantity suppressing region, an emission quantity promoting region, and a light quantity control region adjacent to said emission quantity suppressing region and said emission quantity promoting region,
      said emission quantity suppressing region has first and second ends and is formed in the vicinity of the effective radiation region of said light source,
      said emission quantity promoting region is formed in the vicinities of the first and second ends of said emission quantity suppressing region so that the light scattering power gradually reduces with increasing distance from said incidence surface, and
      said light quantity control region is formed so that the light scattering power gradually increases with increasing distance from said incidence surface.

7. The surface light source device of side light type according to claim 6, wherein the light scattering regions are formed by ink printing on the light guide plate.

8. The surface light source device of side light type according to claim 2, wherein said light guide plate is formed so that its thickness gradually decreases with increasing distance from said incidence surface.

9. The surface light source device of side light type according to claim 1, wherein said light guide plate is formed so that its thickness gradually decreases with increasing distance from said incidence surface.

10. The surface light source device of side light type according to claim 3, wherein said light guide plate is formed so that its thickness gradually decreases with increasing distance from said incidence surface.

11. The surface light source device of side light type according to claim 1, wherein said light guide plate is formed so that its thickness gradually decreases with increasing distance from said incidence surface.

12. The surface light source device of side light type according to claim 4, wherein said light guide plate is formed so that its thickness gradually decreases with increasing distance from said incidence surface.

* * * * *